United States Patent Office.

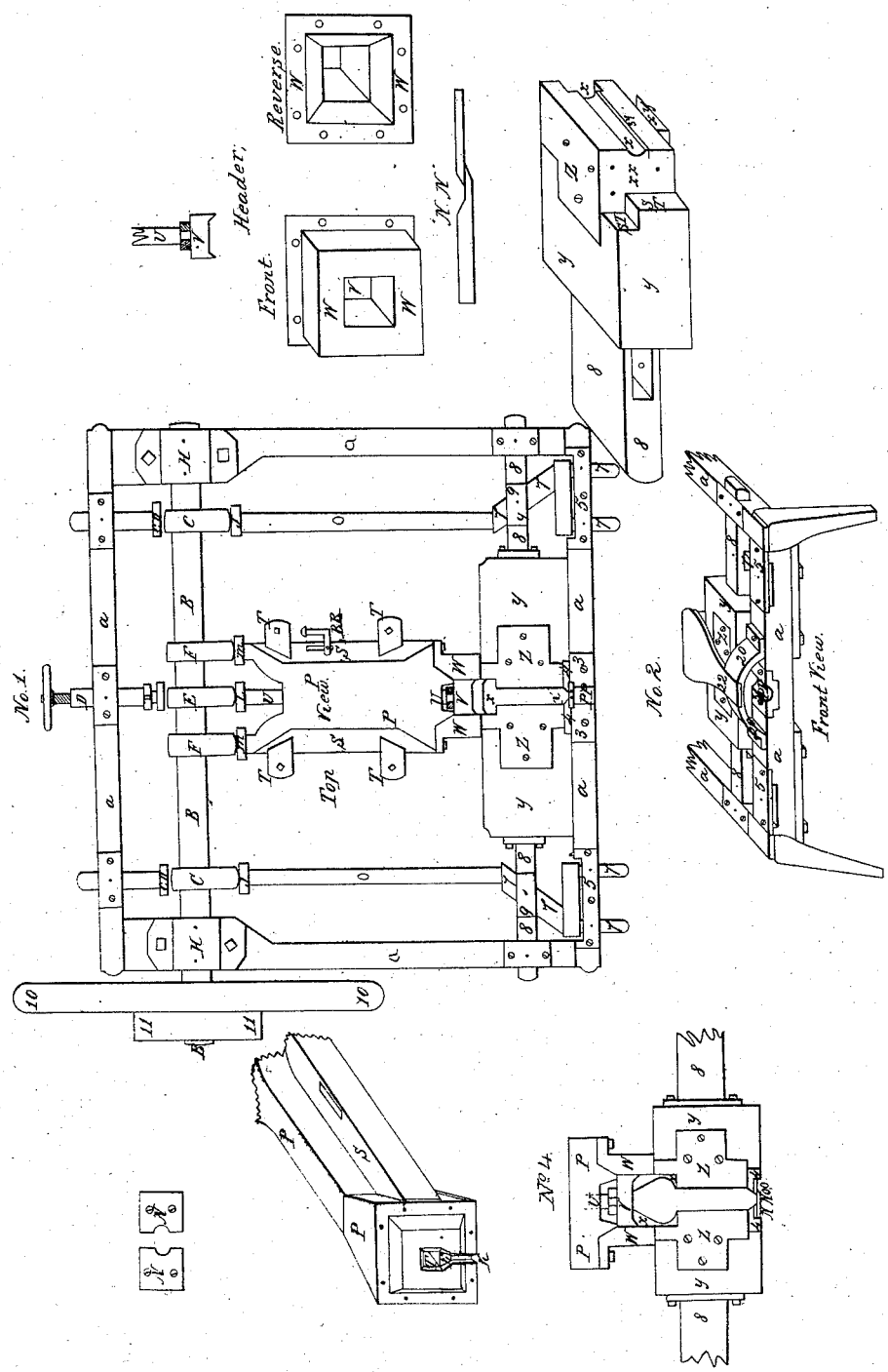

JOHN MORGAN, JR., OF WHEELING, WEST VIRGINIA.

Letters Patent No. 63,927, dated April 16, 1867.

---

IMPROVED BOLT AND RIVET MACHINE.

---

The Schedule referred to in these Letters Patent and making part of the same.

---

TO ALL WHOM IT MAY CONCERN:

Be it known that I, JOHN MORGAN, Jr., of Wheeling, in the county of Ohio, and State of West Virginia, have invented a new and improved "Bolt, Rivet, and Railroad Spike Machine," for manufacturing all kinds of iron bolts, boiler and plate rivets, and railroad spikes; and I do hereby declare that the following is a full, clear, and exact description of the construction and operation of the same, reference being had to the annexed drawings, making a part of this specification, in which—

No. 1 is a top view.
No. 2, a front view.
No. 3, a sectional view.
No. 4, a view in which is shown the bolt-head in process of formation.

No. 1, or Top View.

A, frame of machine; B, shaft; C, cams that drive the wedges 7 to and fro through slots 9 in arms 8; D, back end of yoke of cam E, for returning plunger-head V and truck P; E, cam that drives plunger-head V by means of rod U; F, cams that drive truck P, it carrying plunger-head V as far as it goes; H, journal boxes of shaft B; J, bearings for cams C on wedge-rod O; L, bearings for cam E on plunger-rod U; M, bearings for cams F on truck P; O, rods extending from wedges 7 to cam bearings J and cams C; P, truck that carries header W, also the plunger-head V and rod U; S, slides for lugs on truck P, (similar to a T-head on a steam engine;) T, lugs or slides that hold and guide truck P; U, plunger-rod working through truck P, and working plunger-head V; V, plunger-head movable by rod U, detachable; W, header movable by truck P, detachable; X shows space in centre of dies, when closed, where bolt is formed; Y, die carriages, worked by wedges 7 moving through slots 9 in arms 8; Z, dies detachable from carriages Y; C D, back bearings of yokes for cams C; O O, opening between the pointers or knives 4 and frame A, to allow scales to drop; P P, groove in guide 3 for iron rod to slide in; 3, guide for iron rod, movable; 4, pointers or knives for cutting the blank and pointing the bolt; 5, slide-caps for arms 7 of wedge; 7, wedge to give motion to and fro to die carriages Y; 8, arms of die carriages Y; 9, slots in arms 8 through which wedge 7 works; 10, fly-wheel on shaft B; 11, power wheel on shaft B; 12, journals or guides of rod O; B B, arm with rubber-head to deaden the jar of truck P, movable; A B, screw working through inside of stem of yoke of cam E, by which bearing D is changed, thus giving more or less motion to truck P, and by this means forming the gauge for length of blank.

No. 2, or Front View.

A, frame; 3, guide for iron rod; P P, groove in guide 3; 20, supports to hold covering over dies Z and header W; 22, place for the covering.

No. 3, or Sectional Views.

W, header, front and reverse; V, plunger-head detachable from rod U; U, plunger-rod; B B, arm with rubber-head; P, truck for carrying header W; S, slides on truck P; M, bearings for cams on truck P; K, opening for scales to drop, back of plunger-head V; T, hole through truck P, in which rod U works; N N, knives shut, Nos. 1 and 2 denoting right and left-hand knife; Y, die carriages; Z, dies removable; X, hollow where bolt is formed; X Y, jaws on carriages Y for working in dove-tail slides underneath; X X, end of die where pointers or knives 4 fasten; S T, step on carriage Y, that die Z rests on; 54, slot in one die for reception of apron 45 on other die; 45, apron to prevent the heated iron from dropping between the dies; 8, arm of die carriage Y containing slot 9; 9, slot in arm 8 through which wedge 7 works; 4, pointers carrying knives N; G D shows opening between the knives where point of bolt is formed; N, front view of knife; 7, wedge for giving motion to die carriage Y; O, arm or rod of wedge 7.

No. 4.

P, end of truck, header W lapping over it; W, header; U, plunger-rod working through truck P; V, plunger-head working inside of header W; Y, die carriages; Z, dies; I, the iron, red hot, showing the shape it is squeezed into after the dies Z clamp it by the header W carrying the plunger-head V down on it, thus giving it a perfectly solid and sound shoulder, (no lapping of the iron.) Header W now has the iron entirely enclosed, and plunger-head V being pushed down by cam E, compresses the iron into every portion of the mould, as the iron can in no way escape, the knives closing the back end of the mould, and also compresses the pores of the iron and makes it a "hot-pressed bolt."

*Explanations.*

The iron bar (hot) is fed through groove P P in between the dies Z, they being open. The header W and plunger-head V are also drawn back. The head V forms the gauge for a sufficient length of iron to be admitted, the iron being pushed in until it touches head V, then the dies Z close on the bar, cutting off the blank and pointing it, and clamping it securely. The blank is now enclosed everywhere except at the end where the head is to be formed; the knives closing the front opening and keeping the iron from squeezing back, (the cam C pushing the wedges 7 through the arms 8, thus closing and holding securely the dies Z.) The cams F now strike the bearings M and push the truck P and header W in until the header W touches the dies Z, (see No. 4.) The plunger-head V is carried in thus far by the truck P. The head V being a little concave tends to hold the iron to the centre, and by so doing prevents it from bending and lapping at the shoulder. The header W now being down, entirely encloses the iron. Cam E now strikes bearing L, pushing rod U and head V down until the head V goes to the line representing the head of the bolt, shown in drawing No. 1. The projections on the edge of head V are to finish the head of the bolt in good shape, and also to better compress the iron into the extreme corners of the mould. The bolt is now finished. Cam E now strikes the bearing D, pulling the head V back, and it catching truck P pulls it and header W back ready for another bolt; the wedges 7 opening the dies Z, immediately after the header W is relieved from bearing on them. The arm B B counteracts the thump and jar of truck P. When the dies open they pull back far enough to allow the bolt to drop through between the apron 45 and opposite die, but immediately partially close, so that apron 45 just touches in slot 54, thus securing the iron from getting down between the dies, either from its being too hot and bending, or from being pushed in crooked.

If it is desirable to have but one die move, it can easily be so changed. Thus, let the right-hand die be stationary and the left-hand one move; put the grooved piece 3 over towards the left, until the groove P P clears the edge of the knife on the right-hand die; disconnect the rod O from wedge 7, and put a key or pin through arm 8, and the frame and it (the right-hand die) are converted into a stationary one. The left-hand die being drawn back admits the iron, and when it comes up it cuts the blank off and carries it over into the mould. To connect up again, to work both dies on large bolts, connect rod O, take the key out of frame and arm 8, and replace the guide 3, and both dies are again ready for work. The header W is attached to truck P by two or four screws easily removed. Take header W off and you have plunger-head V exposed. You can now unscrew head V off of rod U, and place a different size or shape of head and header on, thus in a few minutes changing the size or shape of the head. The dies Z are held on the carriages by one key each, and can be removed very quickly when desiring to put on dies of different size. The knives can be attached to the dies themselves for smaller bolts, but in making larger ones it would be preferable to use the pointer 4 in connection with them. The same pointer will answer for different lengths of bolts provided the diameter is the same.

Every revolution makes a bolt complete—can easily be run on average bolts at from twenty to thirty revolutions per minute. By putting in dies and header suitable, (as shown in drawing,) the machine will make boiler and plate rivets just as well as bolts—same in case of making railroad spikes.

The drawing shows the head of the bolt as being made at right angles with the top of the dies; but it is not. It is made in this manner, (see diagram,) two of the corners pointing inward, and two being at the joint or seam of the dies, thus keeping the head free from burrs or seams, and also preventing it from sticking in the dies.

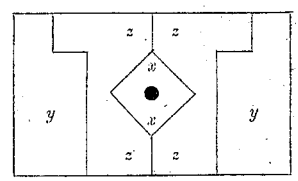

In making very long bolts for bridge work or anything of that kind, take off the knives and pointer, and remove the covering from over the dies. You can take an iron bar of any length that can be handled, insert one end, (running the machine very slowly,) and soon as the head is formed and the dies open, raise or lift the bar out, instead of waiting for the bolt to drop through. Long bolts can then be made in less time than a blacksmith could cut the bar in two preparatory to making a head. I claim that this is the only bolt machine that will do this, "make a bolt of any length whatever." Stove rods and bolts can be quickly and cheaply made in the same manner.

The dies always move the same distance; their motion is never changed. The head of the bolt is always formed at the same place, the point extending or receding to or from the front of the dies. The header W always comes up to the dies; its cams F are never changed. Head V also always comes up to the same line. The head V being the gauge for the necessary length of iron, it must for different sizes and lengths of bolts admit more or less iron, consequently the head V must draw back (and with it the header W and truck P) further in some than others. This is done by the bearing D on back end of yoke being withdrawn or extended, by means of screw A B, so as to shorten or lengthen the distance head V and header W are to be drawn back.

*Claim 1.*

The combination of the die stocks Y, lever-rods O, stirrups, and cams, substantially as arranged and set forth.

*Claim 2.*

The arrangement of the header V, plunger U, cams F and E, loose stirrups, and thumb-screws A B.

JNO. MORGAN, Jr.

Witnesses:
 B. F. LITTLE,
 A. W. PAULL.